United States Patent [19]

Handke et al.

[11] 4,438,834
[45] Mar. 27, 1984

[54] HYDRO-PNEUMATIC DAMPING UNIT

[75] Inventors: Günther Handke, Euerbach; Johachim Kopic, Schweinfurt, both of Fed. Rep. of Germany

[73] Assignee: Fichtel & Sachs AG, Schweinfurt, Fed. Rep. of Germany

[21] Appl. No.: 384,384

[22] Filed: Jun. 2, 1982

Related U.S. Application Data

[63] Continuation of Ser. No. 145,837, May 1, 1980, abandoned.

[30] Foreign Application Priority Data

Jun. 1, 1979 [DE] Fed. Rep. of Germany ....... 2922437

[51] Int. Cl.$^3$ .............................................. F16F 9/36
[52] U.S. Cl. .............................. 188/322.16; 188/315; 188/322.17; 277/187; 277/188 R
[58] Field of Search ...................... 188/322.16, 322.17, 188/315; 267/126, 129, 136, 113; 277/184, 187, 188 R, 189; 308/3.5; 280/668

[56] References Cited

U.S. PATENT DOCUMENTS

| | | | |
|---|---|---|---|
| 2,276,406 | 3/1942 | Magrum | 277/188 R X |
| 2,458,206 | 1/1949 | Rossmann | 188/315 |
| 2,606,630 | 8/1952 | Rossmann | 188/315 |
| 2,653,683 | 9/1953 | Strauss | 188/315 |
| 3,446,318 | 5/1969 | Duckett | 188/322.17 X |
| 3,592,164 | 7/1971 | Schultze | 188/322.17 |
| 3,661,236 | 5/1972 | Wossner | 188/315 |
| 3,798,744 | 3/1974 | Smith | 188/298 |
| 3,874,485 | 4/1975 | Smith | 188/315 |
| 4,057,236 | 11/1977 | Hennells | 188/315 |
| 4,240,531 | 12/1980 | Postema | 188/315 |

FOREIGN PATENT DOCUMENTS

| | | | |
|---|---|---|---|
| 1286890 | 1/1962 | France . | |
| 683084 | 2/1965 | Italy | 188/315 |
| 1052680 | 12/1966 | United Kingdom . | |
| 1115890 | 5/1968 | United Kingdom . | |
| 1318191 | 5/1973 | United Kingdom . | |

*Primary Examiner*—George E. A. Halvosa
*Attorney, Agent, or Firm*—Toren, McGeady and Stanger

[57] ABSTRACT

An improved hydro-pneumatic damping unit includes a cylinder member, a piston rod extending through a central cavity in the cylinder member and within a guiding bore of a guiding and sealing unit at one end of the cylinder member, and a cylindrical container coaxially surrounding the cylinder member. The guiding and sealing unit includes a guiding member housed inside an axial section of the cylindrical container, and a bridging arrangement is arranged to center the guiding member relative to the container. At least the part of the guiding member which is housed inside the axial section of the container has an outer diameter which is smaller than the inner diameter of the container section. Also, the bridging arrangement includes an annular centering member between the container and the guiding member for radially centering the guiding member relative to the container, and an annular sealing member cooperative with the annular centering member seals the annular cavity in the axial direction of the container.

33 Claims, 8 Drawing Figures

HYDRO-PNEUMATIC DAMPING UNIT

This is a continuation of Application Ser. No. 145,837 filed on May 1, 1980, now abandoned.

The present invention relates generally to a hydro-pneumatic damping unit to be used as a shock absorber or as a part of a telescopic strut mechanism.

Units of the type to which the present invention relates usually comprise (1) a cylinder member having an axis and two ends, a central cavity being defined within said cylinder member between said two ends, a first of said ends being provided with an axially directed piston rod guiding and sealing unit, said piston rod guiding and sealing unit including a guiding member having an axially directed guiding bore, which is radially centered with respect to said cylinder member;

(2) a piston rod extending inward and outward of said cavity through said guiding bore;

(3) a piston unit attached to the inner section of said piston rod, said piston unit dividing said central cavity into two cylinder chambers, a first cylinder chamber adjacent said first end of said cylinder member and a second cylinder chamber adjacent the second end of said cylinder member, said two cylinder chambers being connected across said piston unit by throtteled first fluid passage means;

(4) a body of liquid contained in said two cylinder chambers;

(5) a cylindrical container surrounding said cylinder member, said container having a first end adjacent said first end of said cylinder member and a closed, second end adjacent the second end of said cylinder member, an annular cavity being defined between said cylinder member and said cylindrical container, said annular cavity being connected to said second cylinder chamber by throtteled, second fluid passage means adjacent the second end of said cylinder member, said annular cavity being partially filled with a liquid and partially filled with a gas, at least an axial inner section of said guding member being housed inside said cylindrical container adjacent the first end thereof;

(6) annular cavity bridging means being provided adjacent the first end of said container for axially closing said annular cavity and radially centering said guiding member with respect to said container.

In known units of this type the guiding member is in contact with the radially inner circumferential face of the container. It is therefore necessary, that the outer diameter of the guiding member precisely corresponds to the inner diameter of the container. As the inner diameter of the container frequently varies in accordance with the requirements of the specific construction, in which the damping unit is to be used, it is necessary, that also the guiding members must be manufactured in different sizes adapted to the diferent containers. This increases the cost involved in manufacturing the damping units especially in cases, in which the guiding members are made from sintered material.

It is the task of the present invention to provide a hydro-pneumatic damping unit, which eliminates many of the disadvantages of prior art structures and especially insures the use of different sizes of containers in combination with a standard size of guiding members.

SUMMARY OF THE INVENTION

Briefly, in accordance with the present invention, the hydro-pneumatic damping unit comprises a cylinder member, a central cavity being defined within said cylinder member, a guiding and sealing unit at a first end of said cylinder member, said guiding and sealing unit comprising a guiding member, a piston unit provided within said central cavity, a piston rod connected to said piston unit and extending through a bore of said guiding member, a cylindrical container surrounding said cylinder member and having a first end adjacent the first end of said cylinder member and defining an annular cavity around said cylinder member, said annular cavity being connected by fluid passage means to said central cavity and annular cavity bridging means being provided adjacent the first end of said container for axially closing said annular cavity and radially centering said guiding member with respect to said container.

In accordance with one feature of the invention the outer diameter of said guiding member is smaller, than the inner diameter of said container and said bridging means comprise an annular centering member separate from both said container and said guiding member for radially centering said guiding member with respect to said container.

In accordance with a further feature of this invention an annular cavity sealing member is housed in radial direction between a radially outer circumferential face of said guiding member and a radially inner circumferential face of said container and in axial direction between first and second supporting members, said first and said second annular supporting members providing substantially axially directed sealing member engagement faces.

In accordance with another feature of the invention said annular centering member is established by at least one of said annular supporting members.

Further features of this invention relate to the construction and the position of said annular supporting members with respect to said guiding member and to additional functions of said annular supporting members.

The various features of novelty, which characterise the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
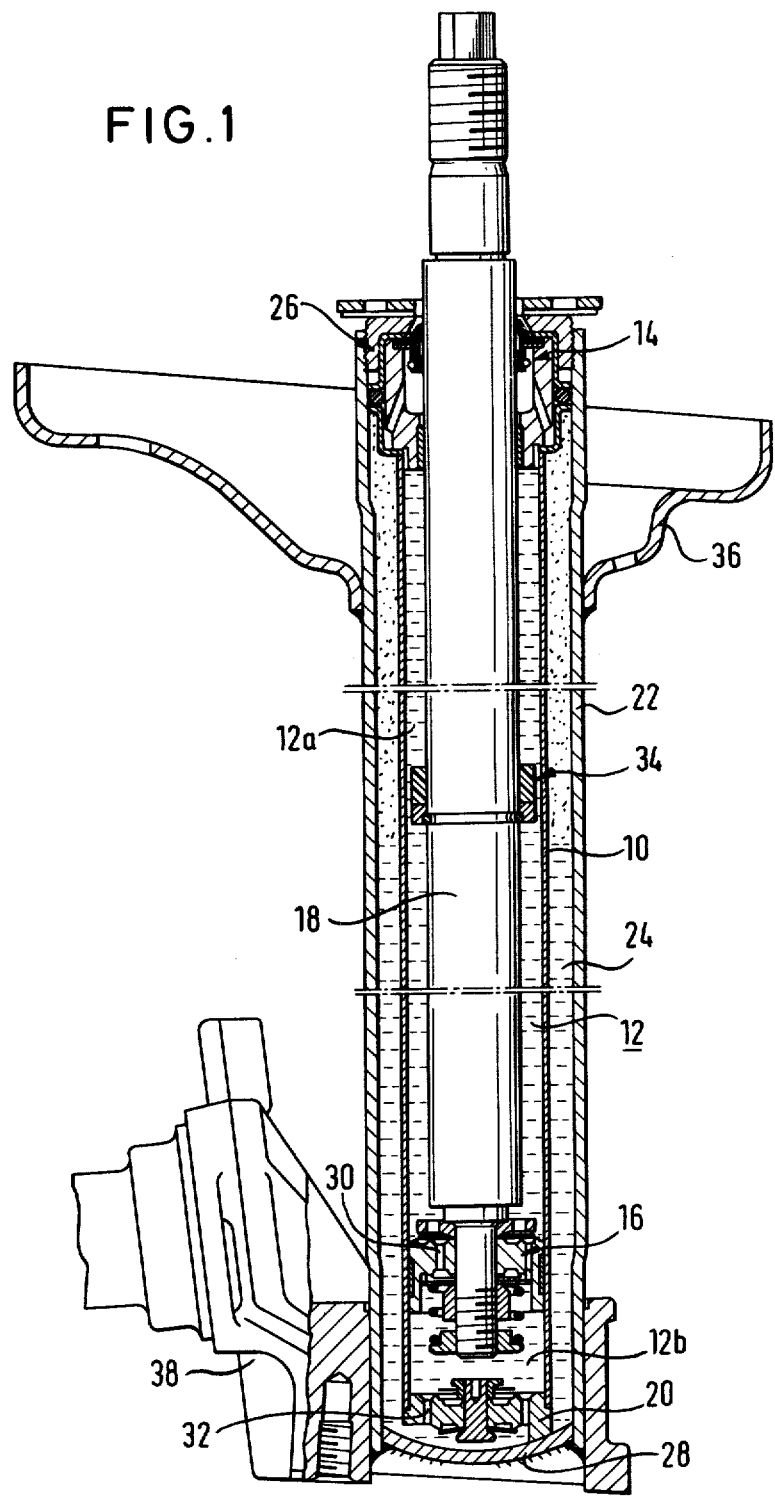
FIG. 1 is a sectional view showing a telescopic strut mechanism showing a first embodiment of this invention.

In FIG. 1 10 designates a cylinder member. Within this cylinder member 10 there is defined a central cavity 12. The cylinder member 10 is closed at its first end by a guiding and sealing unit generally designated by 14. A piston unit 16 is provided inside the cavity 12. This piston unit 16 is fixed to the inner end of a piston rod 18 extending inward and outward the central cavity 12 and passing through the guiding and sealing unit 14. At the second end of the cylinder member 10, which is the lower end, as shown in FIG. 1, there is provided a bottom valve unit 20. The cylinder member 10 is surrounded by a cylindrical container 22. The container 22 and the cylinder member define an annular cavity 24. This annular cavity 24 is closed at a first end of the container 22, which is the upper end as shown in FIG. 1, by annular cavity bridging means, which are designated by 26. This annular cavity bridging means have the additional function of centering the guiding and sealing unit 14 with respect to the container 22. The second or lower end of the container 22 is closed by a substantially spherical bottom wall 28. This bottom wall 28 serves as an abutment for the bottom valve unit 20, the bottom valve unit 20 being axially pressed against bottom wall 28 by the annular cavity bridging means 26, the axial force being transmitted by the guiding and damping unit 14 and the cylinder member 10.

The piston unit 16 defines a first cylinder chamber 12a and a second cylinder chamber 12b within the cavity 12. The cylinder chambers 12a and 12b are filled with a liquid, for example an hydraulic oil. The annular cavity 24 is partially filled with a liquid and partially with a gas. The gas may be air. The air may be under pressure. The pressure of the air may be a low pressure, which is substantially equal to atmospheric pressure, when the piston rod 18 is in its uppermost position as shown in FIG. 1 so that only a rise in pressure occurs, when the piston rod 18 is moved into its downward position as shown in FIG. 1. It is possible however to provide a considerable air pressure within annular cavity 24 independently of the position of the piston rod 18, so that the unit acts as a gas spring in addition to its damping function.

Across the piston unit 16 there extend throttled first fluid passage means 30, which provide a fluid connection between the first and the second cylinder chambers 12a and 12b respectively. Second throttled fluid passage means 32 are provided by the bottom valve unit 20, which provide a fluid connection between the second cylinder chamber 12b and the annular cavity 24. An abutment unit 34 is provided on the piston rod 18, which abutment unit abuts against the guiding and sealing unit 14, when the piston rod 18 approaches its uppermost position as shown in FIG. 1, so as to limit the outward movement of the piston rod 18.

The container 22 is provided with a supporting dish 36 for engaging a helical compression spring associated to the telescopic strut mechanism as known per se. Further the lower or second end of the container 22 is mechanically fixed to an axle spindle unit 38, on which a steered wheel of a motor vehicle may be rotatably mounted, in which case the container 22 is rotatable about the axis of the piston rod 18.

Figure 2:
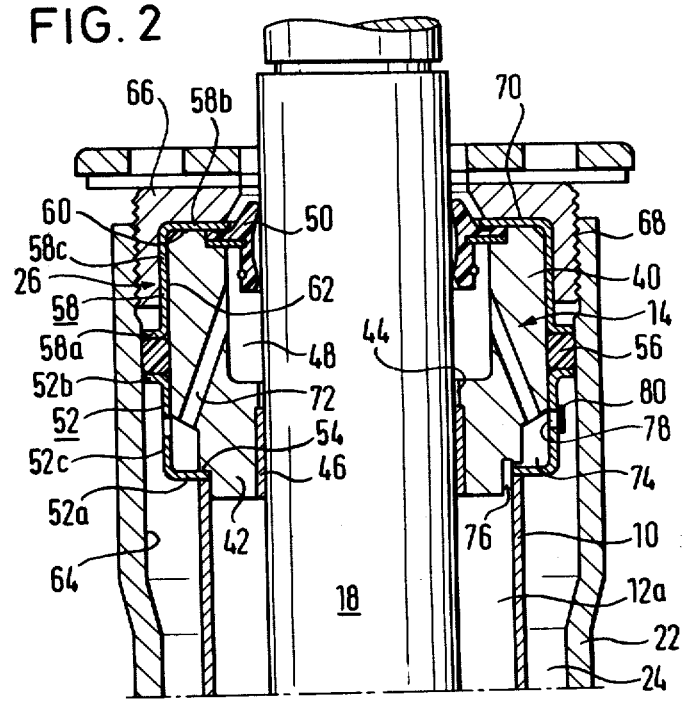
FIG. 2 is an enlarged sectional view of the guiding and sealing unit and the annular cavity bridging means.

The guiding and sealing unit 14 and the bridging means 26 are shown in more detail in FIG. 2.

According to FIG. 2 the guiding and sealing unit 14 comprises a guiding member 40, which guiding member has an axial extension 42 engaging the inner circumferential face of the cylinder member 10. Further the guiding member 14 is provided with an axial bore 44. The piston rod 18 passes through said bore 44. The bore 44 is lined with a lining sleeve 46 made, for example, of a plastic material. An annular sealing chamber 48 is provided within the guiding member 40. This sealing chamber 48 is closed at its upper end by a piston rod sealing member 50 sealingly engaging both the piston rod 18 and the guiding member 40.

The guiding member 40 has an outer diameter, which is smaller, than the inner diameter of the container 22. A second annular supporting member 52 is provided between the guiding member 40 and the container 22. This second annular supporting member 52 comprises a first flange 52a, which is positioned between the upper end of the cylinder member 10 and a shoulder face 54 of the guiding member 40. Further the first annular supporting member 52 comprises a second flange 52b and an intermediate section 52c. An annular cavity sealing member 56 is provided adjacent the second flange 52b. A first annular supporting member 58 is provided on the upper side of the annular cavity sealing member 56. This first annular supporting member 58 comprises a second flange 58a adjacent the annular cavity sealing member 56, a first flange 58b adjacent an outer axial end face 60 of the guiding member 40 and an intermediate section 58c adjacent the outer circumferential face 62 of the guiding member 40. At least one of the flanges 52b and 58a acts as an annular centering member centering the guiding member 40 with respect to the inner circumferential face 64 of the container 22. The first annular supporting member 58 is axially positioned by a cap-shaped holding member 66, which is in engagement with the outer circumferential face of the container 22 by thread means 68. The holding member 66 comprises a holding face 70, which holds the flange 58b in engagement with the axial end face 60. By this holding member 66 the guiding member 40 and the cylinder member 10 are urged in downward direction as seen in FIGS. 1 and 2, so that the bottom valve unit 20 is pressed against the bottom wall 28 and centered with respect to the container 22. The annular cavity sealing member 56 is axially compressed between the flanges 52b and 58a, so as to be urged in sealing engagement with the outer circumferential face 62 of the guiding member 40 and with the inner circumferential face 64 of the container 22. The piston rod sealing member 50 is axially fixed by the flange 58b.

Both the first annular supporting member 58 and second annular supporting member 52 are preferably formed of sheet material such as sheet metal and, as shown in FIG. 2, the intermediate sections 58c and 52c of the supporting members have a radial thickness which is less than one-half the difference between the outer diameter of the part of the guiding member 40 housed within the container 22, and the inner diameter of the confronting portion of the container. Further, the second flanges 52b, 58a of the supporting members extend radially between the guiding member 40 and the container 22.

The annular sealing chamber 48 is connected by a bore 72 with an annular fluid collecting chamber 74, which is defined by the guiding member 40 and the second supporting member 52. The fluid collecting chamber 74 is connected to the upper cylinder chamber 12a by first bleed means 76. Further the fluid collecting chamber 74 is connected by second bleed means 78 to the annular cavity 24.

In operation, when the piston rod 18 moves upward as seen in FIGS. 1 and 2, air bubbles contained in the cylinder chamber 12a can escape through the first bleed means 76 into the fluid collecting chamber 74 and across the plastic liner 46 into the annular sealing chamber 48. This air can return through second bleed means 78 into the annular cavity 24. Liquid is collected in the fluid collecting chamber 74 below the second bleed means 78, so that during downward movement of the piston rod, when partial vacuum may occur in cylinder chamber 12a, liquid (and substantially no gas) returns from the fluid collecting chamber 74 into the cylinder chamber 12a. A check valve established by an elastic sleeve 80 as shown in the right hand side of FIG. 2 may be associated to the second bleed means 78, so that fluid can flow only from the fluid collecting chamber 74 to the annular cavity 24, but not in the other direction.

Figure 3:
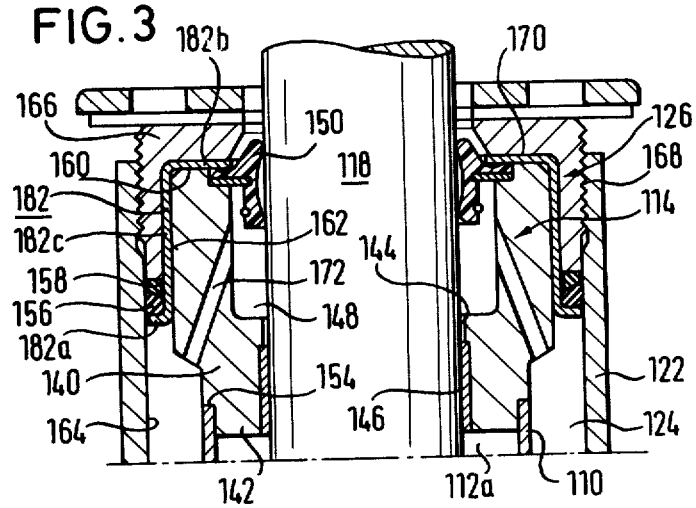
FIG. 3 is a second embodiment of the guiding and sealing unit and the annular cavity bridging means.

In the embodiment of FIG. 3 analogous parts are designated by the same reference numbers as in the embodiments of FIGS. 1 and 2 increased by 100.

In the embodiment of FIG. 3 the second annular supporting member is designated by 182. This second annular supporting member 182 comprises a first flange 182a adjacent the annular cavity sealing member 156 and a second flange 182b adjacent the outer axial end face 160 of the guiding member 140 and an intermediate section 182c. The intermediate section 182c is adjacent the outer circumferential face 162 of the guiding member 140. In this embodiment the annular cavity sealing member 156 and the second annular supporting member 158 are housed between the inner circumferential face 164 of the container 122 and the intermediate section 182c of the second annular supporting member 182, the holding member 156 pressing the flange 182b against the axial end face 160 of the guiding member 140 and urging the first annular supporting member 158 against the annular cavity sealing member 156. It is important in this construction, that the flange 182b is in sealing engagment with the piston rod sealing member 150.

Figure 4:
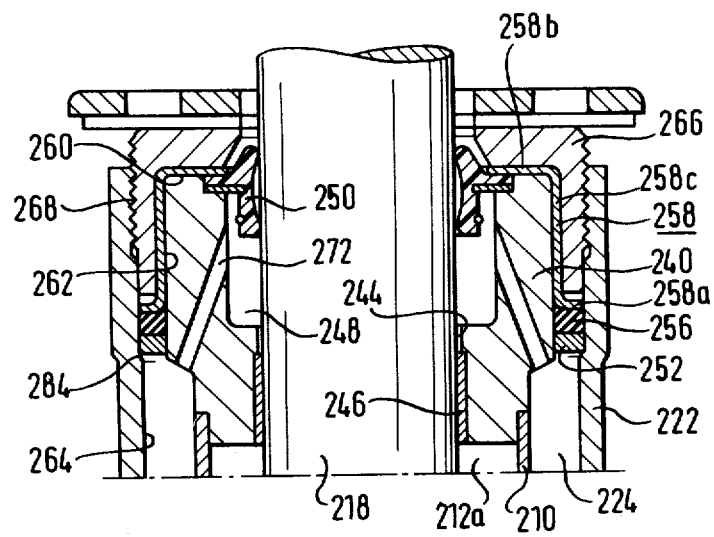
FIG. 4 is a third embodiment of the guiding and sealing unit and the annular cavity bridging means.

In the embodiment of FIG. 4 analogous parts are designated with the same reference numbers as in the embodiment of FIG. 2, increased by 200.

The embodiment of FIG. 4 is different from the embodiment of FIG. 2 by a different shape of the second annular supporting member 252. The annular supporting member 252 is axially positioned by a shoulder 284 provided at the inner circumferential face 264 of the container 222. It is to be noted, that either the first annular supporting member 258 with its flange 258a or the second annular supporting member 252 functions as an annular centering member. The holding member 266 urges the flange 258b against the axial end face 260 of the guiding member 240 and simultaneously urges flange 258a against the annular cavity sealing member 256, so that this annular cavity sealing member is in sealing engagement with both the inner circumferential face 264 of the container 222 and the outer cicumferential face 262 of the guiding member 240. The holding member 266 is cap-shaped as in FIG. 2 and in threaded engagement with the inner circumferential face of the container 222. The intermediate section 258 is in engagement with the outer circumferential face 262 of the guiding member 240.

Figure 5:
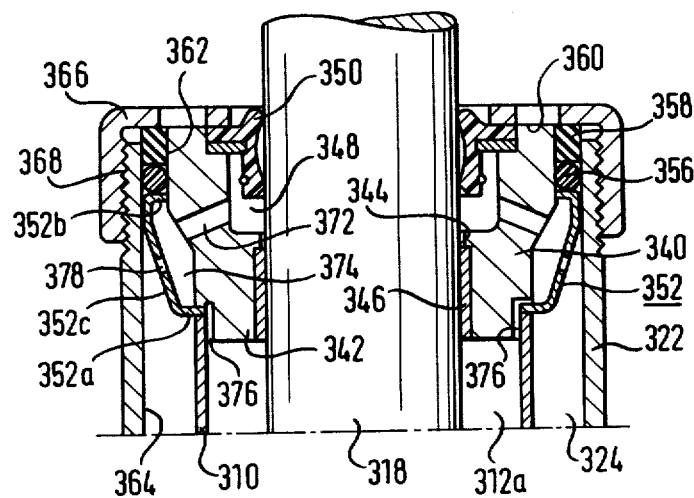
FIG. 5 is a fourth embodiment of the guiding and sealing unit and the annular cavity bridging means.

In the embodiment of FIG. 5 analogous parts are designated with the same reference numbers as in FIG. 2 increased by 300.

The embodiment of FIG. 5 differs from the embodiment of FIG. 2 by another shape of the second annular supporting member 352, which shows two axially inward directed flanges 352a and 352b. The first annular supporting member 358 is a plastic ring of rectangular cross section. The annular cavity sealing member 356 is compressed between flange 352b and the first annular supporting member 358, so as to engage the inner circumferential face 364 of the container 322 and the outer circumferential face 362 of the guiding member 340. The holding member 366 is cap-shaped and engages the outer circumferential face of the container 322 by thread means 368. The holding member 366 engages the axial end face 360 of the guiding member 340 and urges the first annular supporting member 358 against the annular cavity sealing member 356. The centering function is fulfilled either by the first annular supporting member 358 or by the second annular supporting member 352.

Figure 6:
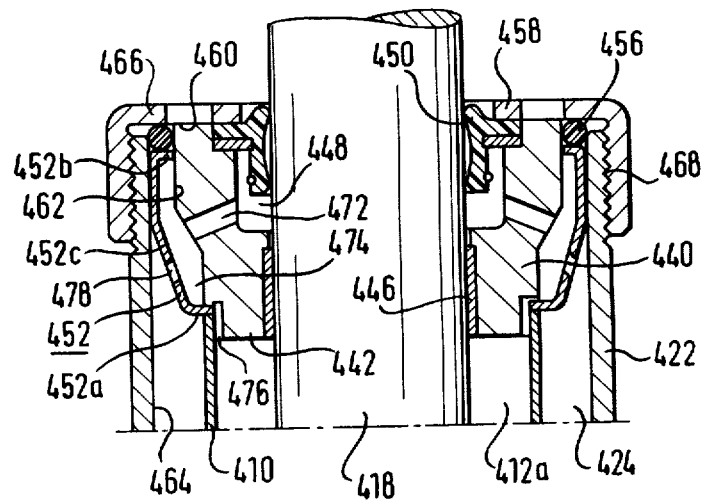
FIG. 6 is a fifth embodiment of the guiding and sealing unit and the annular bridging means.

The embodiment of FIG. 6 is very similar to the embodiment of FIG. 5, analogous parts are designated by the same reference numbers as in FIG. 2 increased by 400.

In the embodiment of FIG. 6—in so far is a difference with respect to FIG. 5—a flange 458 of the holding member 466 fulfills the function of the first annular supporting member. The centering function is fulfilled in this embodiment by the second annular supporting member 452.

Figure 7:
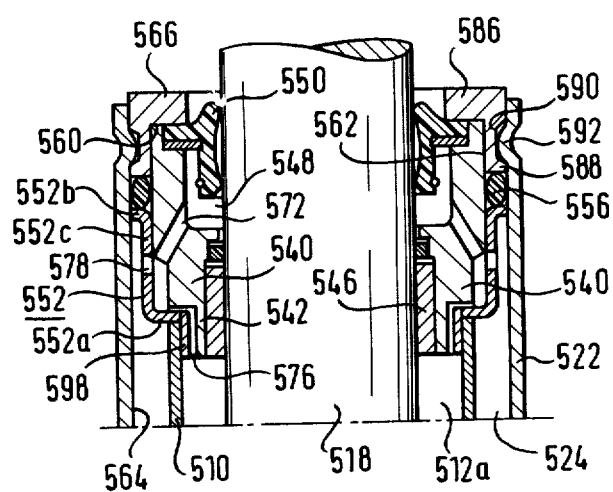
FIG. 7 is a sixth embodiment of the guiding and sealing unit and the annular cavity bridging means and FIG. 8 is a seventh embodiment of the guiding and sealing unit and the annular cavity bridging means.

In the embodiment of FIG. 7 analogous parts are designated by the same reference numbers as in FIG. 2 increased by 500.

In the embodiment of FIG. 7 there is shown a complete double tube damping unit, in which the container 522 is made of a plastic tube. This unit is to be inserted as a whole into the tube of a telescopic strut mechanism for example the container 22 as shown in FIG. 2. The holding member 556 comprises a radially inwardly directed flange 586 and an axial section 588. In the axial section 588 there is provided on the outer circumferential face thereof an annular groove 590. A radially inward directed depression 592 of the container 522 engages the annular groove 590. The radial flange 586 is in contact with the axial end face 560 of the guiding member 540. The axial section 588 of the holding member 586 acts as the first annular supporting member urging the annular cavity sealing member 556 against the flange 552b, so that the annular cavity sealing member 556, which is preferably of elastomeric material like rubber, is in sealing engagement with the circumferential face 564 of the container 522 and with the outer circumferential face 562 of the guiding member 540. The engagement of the depression 592 and the annular groove 590 may allow an axial play between the holding member 566 and the container 522. Moreover the container 522 may be axially compressible, so that an axial force may be transmitted through the flange 586, the guiding member 540 and the cylinder member 510 to the bottom wall 28 as shown in FIG. 1 without substantial axial forces arising in the axial section of the container 522. When the unit of FIG. 7 is mounted in a tube like the tube 22 of FIG. 1, a further holding member may be provided for urging the holding member 566 in axial engagement with the axial end face 560 of the guiding member 540.

The centering function in this embodiment may be fulfilled by the axial section 588 of the holding member 566 or preferably by the second annular supporting member 552.

Figure 8:
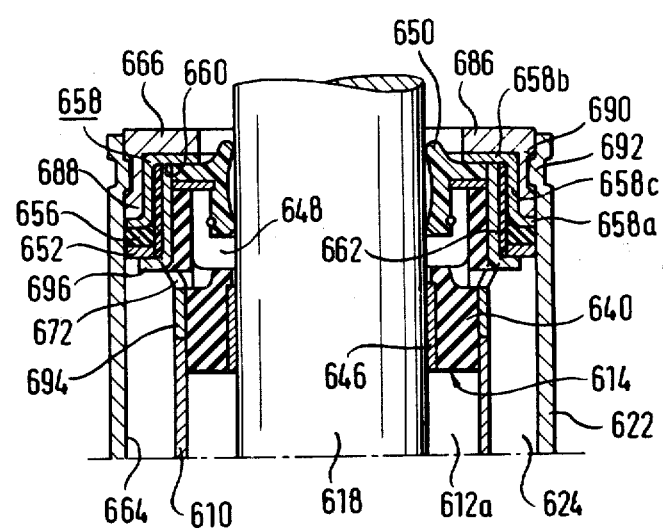

The embodiment of FIG. 8 is similar to the embodiment of FIG. 7 as far as the design of the holding member is concerned. Analogous parts are designated by the same reference numbers as in FIG. 2 increased by 600. The first annular supporting member 658 is similar to the embodiment of FIG. 2.

The guiding member 640 is in this embodiment made of plastic material, whereas in the embodiments as discussed before the guiding member is of metallic or sintered material. The guiding member 640 is reinforced by a reinforcing sleeve 694. This reinforcing sleeve 694 abuts the upper or first end of the cylinder member 610. In the middle part of the reinforcing sleeve 694 lugs 696 are punched from the reinforcing sleeve and bend in radial outward direction. These lugs 696 provide a seat for the second annular supporting member 652. The annular cavity sealing member 656 is axially compressed between the flange 658a of the first annular supporting member 658 and the second annular supporting member 652, so as to sealingly engage the inner circumferential face 664 of the container 622 and the outer circumferential face 662 of the guiding member 614. The container 622 can be again be compressible plastic material and a lost motion may be possible between the depression 692 and the annular groove 690. The radial flange 686 of the holding member 666 urges the flange 658b against the axial end face 660 of the guiding member 640.

With respect to FIG. 7 it is still to be noted, that an annular adapter member 598 is provided on the axial extension 542 of the guiding member 540 for adapting the guiding member 540 to cylinder members 510 of varying inner diameter.

It is to be noted, that in all embodiments the first or upper end of the cylinder member may be pressure fitted on to the axial extension of the guiding member.

In the embodiments of FIGS. 7 and 8 the depressions 592 and 692 respectively may be preshaped in the container before mounting the unit, so that the depressions 592 and 692 engage the annular groove 590 and 690 respectively by a snap action after a preliminary circumferential elongation of the container.

In FIG. 8 it is to be noted, that passages 672 between the annular sealing chamber 648 and the annular cavity 624 are provided by the formation of the lugs 696.

The embodiment of the double tube shock absorbers of FIGS. 7 and 8 may be used in the telescopic strut mechanism of FIG. 1, when after a period of use the damping action is reduced. It is however possible also to provide a double tube shock absorber according to FIGS. 7 and 8 in a container 22 of FIG. 1 already when the telescopic strut mechanism is marketed for the first time.

As far as the embodiment of FIG. 8 is concerned, it should be noted, that the guiding member 640 may be moulded according to conventional moulding methods, the reinforcement sleeve 694 being embedded during the moulding step.

It is possible in all embodiments of this invention to prefabricate units comprising the cylinder member, the bottom valve unit and at least part of the sealing and guiding unit and to insert such prefabricated units at a later date into the container.

It is a specific advantage of this invention, that the guiding members can be used in containers of varying inner diameter without the necessity of milling the guide members for adapting them to the inner diameter of the container. The annular centering members and/or the annular supporting members are cheap in manufacturing and can be manufactured and stored for all possible combinations of containers and guiding members.

The fact that the annular supporting members 52, 58 can be formed of, for example, sheet metal, provides a distinct advantage over the various known constructions. Apart from the fact that the supporting members do not require expensive machining while, at the same time, can be used in damping units of various sizes as mentioned above, the piston rod guiding member 40, sealing member 50, annular supporting members 52, 58, and annular sealing member 56 all may be preassembled at one end of the piston rod 18 prior to insertion within the container 22 and tightening of the threaded holding member 66. Moreover, the first and second annular supporting members may be fixed on the guiding member 40 with small initial stress.

While specific embodiments of the invention have been shown and described in detail to illustrate the application of the inventive principles, it will be understood that the invention may be embodied otherwise without departing from such principles.

What is claimed is:

1. In a hydro-pneumatic damping unit which includes an elongated cylinder member forming a central cavity between first and second ends of said cylinder member, a piston rod guiding and sealing unit including a guiding member arranged at the first end of said cylinder member, said guiding and sealing unit having a guiding bore coaxially aligned with said cylinder member, an elongated piston rod extending through the central cavity and within the guiding bore of said guiding and sealing unit for movement in the axial direction of said cylinder member, a piston unit fixed to said piston rod within said central cvity to divide the central cavity into a first cylinder chamber adjacent the first end of said cylinder member and a second cylinder chamber adjacent the second end of said cylinder member, first fluid passage means associated with said piston unit for providing throttled fluid communication between the first and the second cylinder chambers when said piston rod is axially moved relative to said cylinder member, the first and the second cylinder chambers containing a body of liquid, a cylindrical container coaxially surrounding said cylinder member to form an annular cavity, said container having a first end adjacent the first end of said cylinder member and a closed, second end adjacent the second end of said cylinder member, second fluid passage means adjacent the second end of said cylinder member for providing throttled fluid communication between the annular cavity and the second cylinder chamber when said piston rod is axially moved relative to said cylinder member, the annular cavity being partly filled with a liquid and partly filled with a gas, at least a part of said guiding member being housed inside an axial section of said cylindrical container adjacent the first end of said cylindrical container, and annular cavity bridging means adjacent the first end of said container for closing the annular cavity in the axial direction of said container and for radially centering said guiding member relative to said container, the improvement comprising, at least the part of said guiding member housed inside said axial section of said cylindrical container has an outer diameter smaller than the inner diameter of said axial section of said container; said guiding member forming a contact surface which is directed substantially in the axial direction of said cylindrical container; and said bridging means includes a first annular supporting member axially fixed with respect to said guiding member and having a sealing face directed toward the second end of said cylinder member, a second annular supporting member axially fixed with respect to said guiding member and having a sealing face directed opposite from the second end of said cylinder member, and an annular cavity sealing member which is fitted between the outer circumferential surface of said guiding member and the inner circumferential surface of said container in the radial direction of said container and between the sealing faces of said first and second annular supporting members in the axial direction of said container, at least one of said first and said second annular supporting members comprising sheet material which forms a substantially radially projecting first flange for engaging said substantially axially directed contact surface of said guiding member, a substantially radially projecting second flange for supporting said annular sealing member, and an intermediate section extending generally in the axial direction of said cylinder member for connecting said first flange and said second flange to one another, the radial thickness of said intermediate section being smaller than one-half the difference between said outer diameter of said part of said guiding member housed inside said axial section of said cylindrical container and said inner diameter of said axial section of said container, and said second flange extending radially between said part of said guiding member and said axial section of said container.

2. A hydro-pneumatic damping unit as set forth in claim 1, wherein said guiding member engages the first end of said cylinder member at a certain location on said guiding member, said first flange is located on said second annular supporting member and said first flange is fixed at said certain location against movement in at least one axial direction relative to said guiding member.

3. A hydro-pneumatic damping unit as set forth in claim 2, wherein said guiding member includes an extension in the axial direction of said cylinder member for engaging the inner circumferential surface of said cylinder member, said guiding member has an annular shoulder face axially aligned with said cylinder member and directed toward the second end of said cylinder member, and said second annular supporting member includes said first flange which engages the shoulder face of said guiding member and the first end of said cylinder member so that said second annular supporting member is fixed against axial movement relative to said cylinder member.

4. A hydro-pneumatic damping unit as set forth in claim 3, including an annular adapter member on said part of said guiding member housed inside said container for engaging the inner circumferential surface of said cylinder member.

5. A hydro-pneumatic damping unit as set forth in claim 1, wherein said second annular supporting member includes said first and second flanges and said intermediate section and is substantially Z-shaped in axial cross-section, said intermediate section is adjacent the outer circumferential surface of said guiding member, said first flange extends radially inward from said intermediate section toward the axis of said cylinder member, and said second flange extends radially outward from said intermediate section away from the axis of said cylinder member.

6. A hydro-pneumatic damping unit as set forth in claim 1, wherein said second annular supporting member includes said first and second flanges and said intermediate section and is substantially C-shaped in axial cross-section, said intermediate section is adjacent to the inner circumferential surface of said container, and said first flange and said second flange each extend radially inward from said intermediate section toward the axis of said cylinder member.

7. A hydro-pneumatic damping unit as set forth in claim 1, wherein said guiding member and one of said first and second annular supporting members define an annular fluid collecting chamber, and including first bleed means for providing fluid communication between said annular fluid collecting chamber and said first cylinder chamber in response to axial movement of said piston rod, and second bleed means for providing fluid communication between said annular fluid collecting chamber and said annular cavity in response to axial movement of said piston rod.

8. A hydro-pneumatic damping unit as set forth in claim 7, wherein said annular fluid collecting chamber is defined by said guiding member and said second annular supporting member.

9. A hydro-pneumatic damping unit as set forth in claim 7, wherein said first bleed means is located adjacent the end of said annular fluid collecting chamber in the axial direction of said cylinder member which end is closer to the second end of said cylinder member, and said second bleed means is located a certain distance toward the other end of said annular fluid collecting chamber in the axial direction of said cylinder member.

10. A hydro-pneumatic damping unit as set forth in claim 1, wherein said annular cavity sealing member is in sealing contact with the outer circumferential surface of said guiding member and with the inner circumferential surface of said container.

11. A hydro-pneumatic damping unit as set forth in claim 1, including projection means extending radially inward from the inner circumferential surface of said container for fixing said second annular supporting member against movement in at least one direction along the axis of said container.

12. A hydro-pneumatic damping unit as set forth in claim 11, wherein said projection means includes an annular shoulder of said container.

13. A hydro-pneumatic damping unit as set forth in claim 1, including projection means extending radially outward from the outer circumferential surface of said guiding member for fixing said second annular supporting member against movement in at least one direction along the axis of said container.

14. A hydro-pneumatic damping unit as set forth in claim 13, wherein said guiding member includes an annular plastic member and a metallic sleeve substantially axially aligned with said plastic member for reinforcing said plastic member, and said radially outward projection means includes a number of lugs extending radially outward from said reinforcing sleeve.

15. A hydro-pneumatic damping unit as set forth in claim 1, wherein said bridging means comprises a holding member in fixed engagment with said container for providing a holding force to said cylinder member through said guiding member in the axial direction of said cylinder member so that said cylinder member is held in contact with the second end of said container.

16. A hydro-pneumatic damping unit as set forth in claim 15, wherein the contact surface formed by said guiding member is directed opposite from the second end of said cylinder member, said second annular supporting member comprises sheet material which forms said first flange radially inwardly for engaging said contact surface of said guiding member, said second flange radially outwardly for supporting said annular sealing member, and said intermediate section; and said first annular supporting member is in the form of a ring positioned between the inner circumferential surface of said container and said intermediate section of said second annular supporting member, wherein said holding member urges said first annular supporting member in the direction toward the second end of said cylinder member against said sealing member.

17. A hydro-pneumatic damping unit as set forth in claim 15, wherein the contact surface formed by said guiding member is directed toward the second end of said cylinder member, said second annular supporting member comprising sheet material which forms said first flange radially inwardly for engaging said contact surface of said guiding member, said second flange radially inwardly for supporting said annular sealing member, and said intermediate section; and said first annular supporting member comprises a plastics ring of substantially rectangular cross section positioned between said inner circumferential surface of said container and the outer circumferential surface of said guiding member wherein said holding member urges said first annular supporting member in the direction toward the second end of said cylinder member against said sealing member.

18. A hydro-pneumatic damping unit as set forth in claim 15, wherein the contact surface formed by said guiding member is directed toward the second end of said cylinder member, said second annular supporting member comprising sheet material which forms said first flange radially inwardly for engaging said contact surface of said guiding member, said second flange radially inwardly for supporting said annular sealing member, and said intermediate section; and said first annular supporting member is formed by a radially directed flange part of said holding member.

19. A hydro-pneumatic damping unit as set forth in claim 15, wherein the contact surface formed by said guiding member is directed toward the second end of said cylinder member, said second annular supporting member comprising sheet material which forms said first flange radially inwardly for engaging said contact surface of said guiding member, said second flange radially outwardly for supporting said annular sealing member, and said intermediate section; and said first annular supporting member is formed by an axial section of said holding member.

20. A hydro-pneumatic damping unit as set forth in claim 13, wherein the contact surface formed by said guiding member is directed opposite from the second end of said cylinder member, said first annular supporting member comprising sheet material which forms said first flange radially inwardly for engaging said contact surface of said guiding member, said second flange radially outward for supporting said annular sealing member, and said intermediate section; and said second annular supporting member in the form of a ring positioned by said projection means between the inner circumferential surface of said container and the outer circumferential surface of said guiding member.

21. A hydro-pneumatic damping unit as set forth in claim 15, wherein said holding member is arranged to fix said first annular supporting member with respect to said guiding member in at least one direction along the axis of said container.

22. A hydro-pneumatic damping unit as set forth in claim 21, wherein said first annular supporting member forms an integral part of said holding member.

23. A hydro-pneumatic damping unit as set forth in claim 21, wherein said first annular supporting member is fixed against the end of said guiding member which end is further from the second end of said cylinder member in the axial direction of said cylinder member.

24. A hydro-pneumatic damping unit as set forth in claim 23, wherein said first annular supporting member includes said first and second flanges and said intermediate section and is substantially Z-shaped in axial cross-section, said second flange extending radially outward relative to the outer circumferential surface of said guiding member and adjacent said annular cavity sealing member, said first flange extending radially inward relative to the outer circumferential surface of said guiding member and adjacent said further end of said guiding member, said intermediate section being adjacent the outer circumferential surface of said guiding member, and said holding member has a holding face directed toward the second end of said cylinder member in the axial direction of said cylinder member for contacting said first flange of said first annular supporting member.

25. A hydro-pneumatic damping unit as set forth in claim 24, wherein said guiding member and said piston rod define an annular sealing chamber within said guiding member, and including an annular piston rod sealing member for closing said annular sealing chamber at its end further from the second end of said cylinder member, said piston rod sealing member sealingly engages said guiding member and said piston rod, and said first flange is arranged to fix said piston rod sealing member against axial movement with respect to said cylinder member.

26. A hydro-pneumatic damping unit as set forth in claim 15, wherein said holding member is arranged to fix said second supporting member against movement in at least one direction along the axis of said cylinder member.

27. A hydro-pneumatic damping unit as set forth in claim 26, wherein said second annular supporting member is fixed at the end of said guiding member which end is further from the second end of said cylinder member in the axial direction of said cylinder member.

28. A hydro-pneumatic damping unit as set forth in claim 27, wherein said second annular supporting member includes said first and second flanges and said intermediate section and is substantially Z-shaped in axial cross-section, said second flange being directed radially outward relative to the outer circumferential surface of said guiding member and adjacent said annular sealing member, said first flange being adjacent said further end of said guiding member, and said intermediate section being adjacent the outer circumferential surface of said guiding member, said holding member having a holding face directed toward the second end of said cylinder member in the axial direction of said cylinder member so that said holding face contacts said first flange, said first annular supporting member is positioned between the inner circumferential surface of said container and said intermediate section of said second annular supporting member, and said first annular supporting member is fixed against said holding member in the direction opposite from the second end of said second cylinder member relative to the axis of said cylinder member, said guiding member and said piston rod defining an annular sealing cavity within said guiding member around said piston rod, a piston rod sealing member for closing said annular sealing cavity at its end further from the second end of said cylinder member relative to the axis of said cylinder member, said first flange of said second annular supporting member being arranged to fix said piston rod sealing member against axial movement relative to said cylinder member, said piston rod sealing member sealingly engaging said piston rod and said first flange.

29. A hydro-pneumatic damping unit as set forth in claim 1, wherein a part of at least one of said first and said second annular supporting members defines an annular centering member between said container and said guiding member.

30. A hydro-pneumatic damping unit as set forth in claim 1, wherein said container comprises a tube associated with a telescopic strut mechanism.

31. A hydro-pneumatic damping unit as set forth in claim 1, wherein said annular cavity sealing member is compressed between said first and said second supporting members in the axial direction of said cylinder member.

32. A hydro-pneumatic damping unit as set forth in claim 1, wherein said guiding member forms a pair of oppositely facing contact surfaces, and each of said first and said second annular supporting members comprises sheet material which forms said first flange radially inwardly for engaging a corresponding one of said pair of contact surfaces of said guiding member, said second flange radially outwardly for supporting said annular sealing member, and said intermediate section.

33. A hydro-pneumatic damping unit as set forth in claim 1, wherein the contact surface formed by said guiding member is directed opposite from the second end of said cylinder member, said first annular supporting member comprises sheet material which forms said first flange radially inwardly for engaging said contact surface of said guiding member, said second flange radially outwardly for supporting said annular sealing member, and said intermediate section; said second annular supporting member is in the form of a ring, and said container forms an annular shoulder extending radially inward from the inner circumferential surface of said container for positioning said second annular supporting member between said inner circumferential surface and the outer circumferential surface of said guiding member and for fixing said second annular supporting member against axial movement in the direction toward the second end of said cylinder member.

* * * * *